(12) United States Patent
Basak et al.

(10) Patent No.: US 11,347,743 B2
(45) Date of Patent: May 31, 2022

(54) METADATA CONVERTER AND MEMORY MANAGEMENT SYSTEM

(71) Applicant: SAP SE, Walldorf (DE)

(72) Inventors: Nirvik Basak, Pune (IN); Souvik Pal, West Bengal (IN); Chaitanya Gottipati, Pune (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/878,877

(22) Filed: May 20, 2020

(65) Prior Publication Data

US 2021/0311949 A1    Oct. 7, 2021

(30) Foreign Application Priority Data

Apr. 1, 2020    (IN) .............................. 202011014597

(51) Int. Cl.
*G06F 16/2455*    (2019.01)
*G06F 16/22*    (2019.01)

(52) U.S. Cl.
CPC .... *G06F 16/24561* (2019.01); *G06F 16/2282* (2019.01)

(58) Field of Classification Search
None
See application file for complete search history.

(56) References Cited

U.S. PATENT DOCUMENTS

| | | | |
|---|---|---|---|
| 2009/0210445 A1 | 8/2009 | Draese et al. | |
| 2013/0227236 A1* | 8/2013 | Flynn | G06F 3/061 |
| | | | 711/165 |
| 2014/0279941 A1* | 9/2014 | Atkisson | G06F 16/2365 |
| | | | 707/690 |
| 2015/0058522 A1* | 2/2015 | Armstrong | G06F 9/45533 |
| | | | 711/6 |
| 2015/0363456 A1* | 12/2015 | Raman | G06F 16/282 |
| | | | 707/693 |
| 2016/0147861 A1* | 5/2016 | Schreter | G06F 16/283 |
| | | | 707/607 |
| 2017/0017674 A1 | 1/2017 | Scheuer et al. | |
| 2017/0039232 A1 | 2/2017 | Jayanth et al. | |
| 2017/0147618 A1* | 5/2017 | Geissinger | G06F 16/221 |
| 2017/0344593 A1 | 11/2017 | Mullick et al. | |
| 2018/0336229 A1* | 11/2018 | Muehle | G06F 16/2282 |
| 2019/0129999 A1* | 5/2019 | Baggett | G06F 16/24554 |

(Continued)

*Primary Examiner* — Wilson Lee
(74) *Attorney, Agent, or Firm* — Sterne, Kessler, Goldstein & Fox P.L.L.C.

(57) ABSTRACT

System, method, and various embodiments for providing a metadata converter and memory management system are described herein. An embodiment operates by determining that first metadata corresponding to a table of a database comprising load preferences for a column level for a plurality of columns of the table, wherein the load preferences include either column load or page load. It is determined that the database is enabled with both load preferences for a table level and load preferences partition level, in addition to load preferences for the column level. Values for the load preferences are automatically assigned for both the table level and the partition level in second metadata, and wherein the second metadata preserves the load preferences for the column level of the first metadata. A query against the table based on load preferences from the second metadata.

18 Claims, 5 Drawing Sheets

(56) References Cited

U.S. PATENT DOCUMENTS

| | | | |
|---|---|---|---|
| 2020/0364193 A1* | 11/2020 | Zhou | G06F 11/3414 |
| 2020/0403633 A1* | 12/2020 | Lasch | H03M 7/3088 |
| 2021/0089552 A1* | 3/2021 | Karl | G06F 16/27 |
| 2021/0256063 A1* | 8/2021 | Kasperovics | G06F 16/9024 |
| 2021/0311922 A1 | 10/2021 | Basak et al. | |

* cited by examiner

METADATA CONVERTER AND MEMORY MANAGEMENT SYSTEM

CROSS-REFERENCE TO RELATED APPLICATION

This application claims priority to Indian Patent Application No. 202011014597, titled "Metadata Converter And Memory Management System" to Basak et al., filed Apr. 1, 2020, which is herein incorporated by reference in its entirety.

This application is related to U.S. patent application Ser. No. 16/878,870, titled "Hierarchical Metadata Enhancements for a Memory Management System" to Basak et al. filed May 20, 2020, which is herein incorporated by reference in its entirety.

BACKGROUND

Memory management techniques indicate when and which data to transfer from disk storage to memory for query processing. Effective memory management techniques can greatly improve the resource utilization and throughput of a database system. However, when new memory management techniques are to be used on an existing database system, there needs to be a manner of updating the database system to utilize the new memory management techniques.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a metadata converter and memory management system.

Memory management is an important aspect of database systems. Memory management techniques indicate when and which data to transfer from disk storage to memory for query processing. Effective memory management techniques can greatly improve the resource utilization and throughput of a database system. However, when new memory management techniques are to be used on an existing database system, there needs to be a manner of updating the database system to utilize the new memory management techniques.

Figure 1:
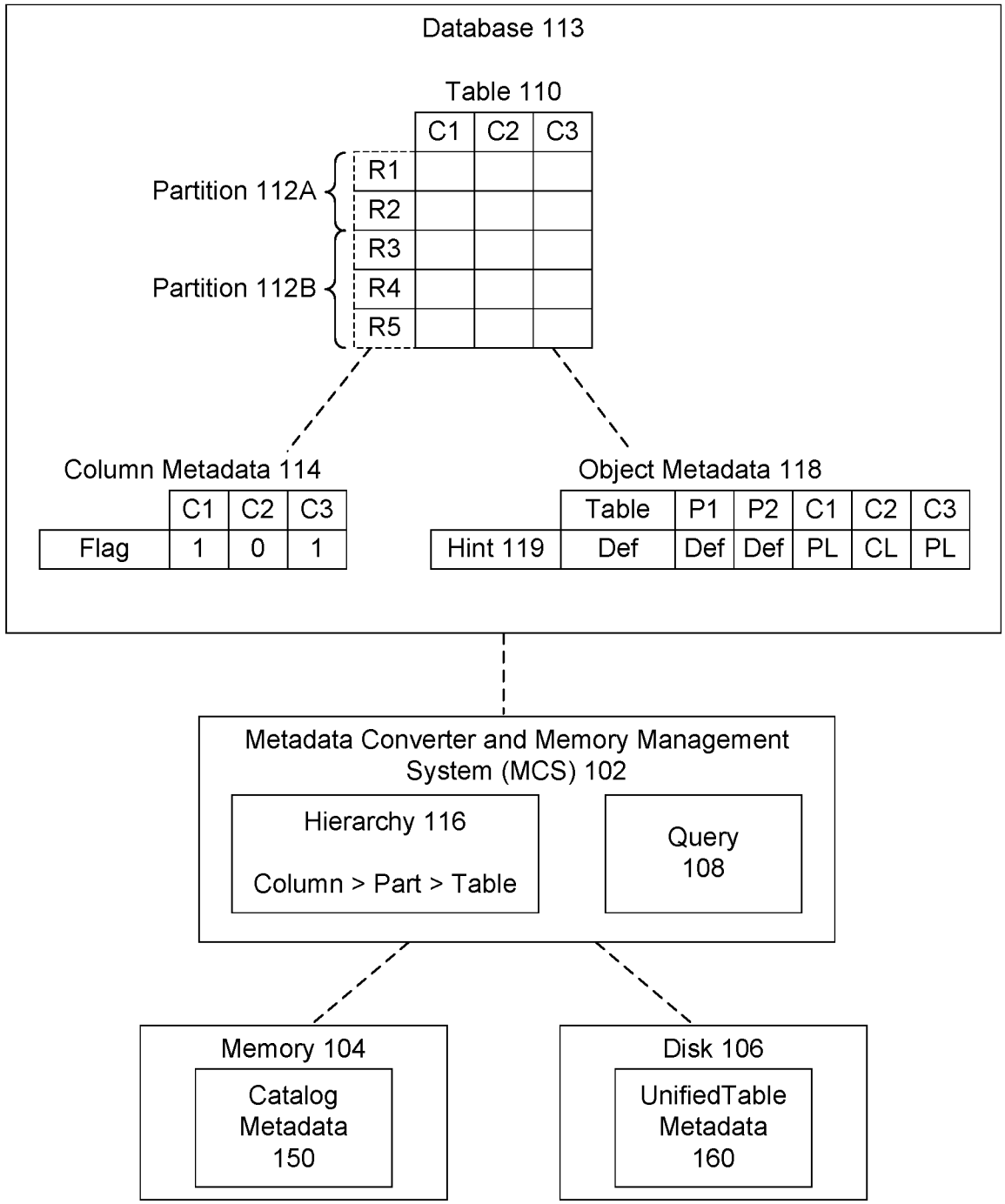
FIG. 1 is a block diagram illustrating example functionality for providing a metadata converter and memory management system (MCS), according to some embodiments.

FIG. 1 is a block diagram 100 illustrating example functionality for providing a metadata converter and memory management system (MCS) 102, according to some embodiments.

When a query 108 on a database 113 is received, for the query 108 to be processed, data from table 110 (to which query 108 is directed) needs to available in a memory 104. Data of database 113 however is generally stored on disk 106. The memory management techniques employed by database 113 may determine when and/or which data from disk 106 should be loaded into (and out of) memory 104. The data in memory 104 may then be used to process incoming one or more incoming queries 108.

As just noted, the data that needs to be searched or returned based on the query 108 first needs to be loaded into memory 104. In a column-oriented database 113, the query 108 on a particular column of data may only require a small subsection of data to be searched or accessed relative to the large amount of data available in the column. In such situations, it is a waste of system resources to load all of the column data into memory 104, when only a small portion of the data is required for processing the query 108.

However one of the challenges in memory management is that the relative amount of space available to store data on memory 104 is limited compared to disk 106. As such, memory management techniques that can balance the resource limitations, as well as the overhead in performing each read/write (to/from disk 106 and/or memory 104) are preferable and often result in improved resource utilization and system performance. These memory management techniques may also be referred to herein as load techniques, as they indicate which data to load into and out of memory.

In an embodiment, database 113 may be a column-store, in memory database. While database 113 may include multiple tables with any numbers of rows and/or columns, spanning into the millions or billions of columns, rows, or tables, for simplicity, only a single table 110 with three columns C1-C3 and five rows R1-R5 is illustrated.

Two example load techniques (for determining how much data to load into memory 104 from disk storage 106) may include page based and column based loading. Column based loading may require that all of the data from a particular column is loaded into and unloaded from memory 104 as a single unit. Page based loaded, by contrast, may allow smaller portions of the column data to be loaded into and evicted from memory 104.

While paged-based loading may provide for better memory utilization by loading smaller portions of relevant or accessed data (e.g., loading in smaller units of memory or data pages), loading full column data (e.g., which can extend across multiple memory pages) is often quicker however it also requires additional memory for the additional data that is being loaded. There is no single data loading and unloading technique (e.g., page or column load) that is best for all of the data needs of a particular database system. Because for the same data, the better or more resource efficient technique may vary over time and may depend on data changes and usage.

Database 113 may be configured or operable to employ either page-based loading or column-based loading. In an embodiment, tables 110 of database 113 may initially be configured to allow for column-level designations for page and column load, as illustrated with column metadata 114. A column-level designation may enable a system or user (such as database administrator) to specify on a column-by-column basis, whether the data of that particular column is to be loaded into memory 104 using page load or column load.

In an embodiment, the column-level designation as to page load or column load may be recorded or stored by database 113 using a flag 115. Flag 115 may, for example, be a Boolean or binary flag, in which a set flag value may indicate page load, and an unset or default flag may indicate column load (or vice versa). As illustrated in column metadata 114, C1 and C3 may include flag 115 as set, so may be page loaded columns, and C2 may be set to column load.

While column-level designations are beneficial when compared to requiring the same load technique for all the tables of a database 113, there are other leveled designations that may provide administrators with greater flexibility or granularity with regard to how to load/unload data to/from memory 104.

Example designations include both partition-level and table-level designations. MCS 102 enables a user or system to further fine tune the loading of data from table 110 into memory by enabling partition-level and table-level preferences or designations for a table 110, in addition to providing for column-level preferences. Using the specified multi-level loading preferences, database 113 or MCS 102 may load and unload between disk storage 106 and memory 104 to increase system throughput and increase resource utilization.

In an embodiment, table 110 may be divided into multiple partitions 112A, B. Partitions may include horizontal divisions of the table 110, including a subset of the rows across all of the columns. For example, partition 112A may include the data from rows R1, R2, and partition 112B may include the data from R3, R4, and R5. As such, partition-level settings or preferences may allow a designation as to how data in a particular partition 112A, B is loaded into (out of) memory 104. Similarly, table-level designations may enable a preference setting for how data of a particular table 110 is loaded into and out of memory 104.

As illustrated, column metadata 114 only accounts for column-level designations. Limiting load preferences to only the column level, as indicated by column metadata 114, may limit the flexibility of a database administrator who may desire to set more finer-tuned or broader-stroked load preferences.

One of the challenges in extending the functionality of database 113 to include partition-level, column-level, and table-level settings is ensuring that the original designations for the columns of column metadata 114 are both translated and preserved.

In an embodiment, to expand the load preferences or capabilities of table 110, to account for both partition-level and table-level designations, the column metadata 114 may need to be expanded or migrated to a new metadata format, illustrated as object metadata 118. Object metadata 118 may include values for table settings, partition settings (P1, P2 corresponding to partitions 112A, 112B respectively), and column settings.

As noted above, column metadata 114 does not account for partition-level or table level designations or settings. As such, there are no previously set values to transfer or migrate over from column metadata 114 to object metadata 118. Because there are no set values, rather than assigning a value to the table-level or partition-level designations, which could become confusing to a database administrator who is later reviewing or updating the object metadata 118, a new value indicating a non-designation may be used. This new value may be referred as default ("Def"). However, as discussed in greater detail below, some tables of database 113 may include a partition-level designation in object metadata 118, even though there is no specific designation in column metadata 114.

The load preference values of object metadata 118 may include page load ("PL"), column load ("CL") and default load ("Def"). Default may be an option that may be used when there was no explicit selection on the load preferences set for a particular database object (e.g., table, partition, or column). For example, since there was no option to set partition level or table level load preferences with column metadata 114, object metadata 118 may fill in those options with the default value.

By only using a single big flag 115, there is no room for a third value to be set that indicates that a user has not assigned either a PL or CL designation. As such, as part of the conversation process, MCS 102 may translate the flag 115 settings into a new hint 119 value.

As illustrated, hint 119 may be any designator or data type that accounts for three or more values, including default ("Def"), page load ("PL") and column load ("CL"). For example, in another embodiment these could correspond to integers: 0, 1, 2. In an embodiment, if other data divisions want to be later added, the range of integers may be expandable up to 255 without requiring any additional memory or disk storage.

MCS 102 may perform this migration or conversion process from column metadata 114 into object metadata 118, thus expanding the load capabilities and improving the resource utilization and management of loading data into and out of memory 104 across one or more tables 110 of database 113. MCS 102 may further preserve any original settings or designations in column metadata 114.

In an embodiment, the metadata of database 113, including both column metadata 114 and object metadata 118, may be stored in two different portions or sections. These may include catalog metadata 150 and UnifiedTable metadata 160. Catalog metadata 150 may include lightweight metadata that is stored and accessible from memory 104, and used to perform query processing and/or receive metadata updates from a user. UnifiedTable metadata 160 may include a heavier weight container, along with additional metadata or settings pertaining to data the table 110.

In an embodiment, there may be a variance in the relative sizes of catalog metadata 550 and UnifiedTable metadata 560, such that catalog metadata 550 is small enough to be stored in memory 104 without hindering system performance in loading data used to process queries 108, while UnifiedTable metadata 560 may be much larger. In an embodiment, UnifiedTable metadata 560 may include a container with information, including, but not limited to the multi-level preferences. In an embodiment, catalog metadata 550 may be loaded from disk 106 into memory 104 on system startup or boot, while UnifiedTable metadata 560 may be loaded into memory 104 when needed.

Figure 2A:
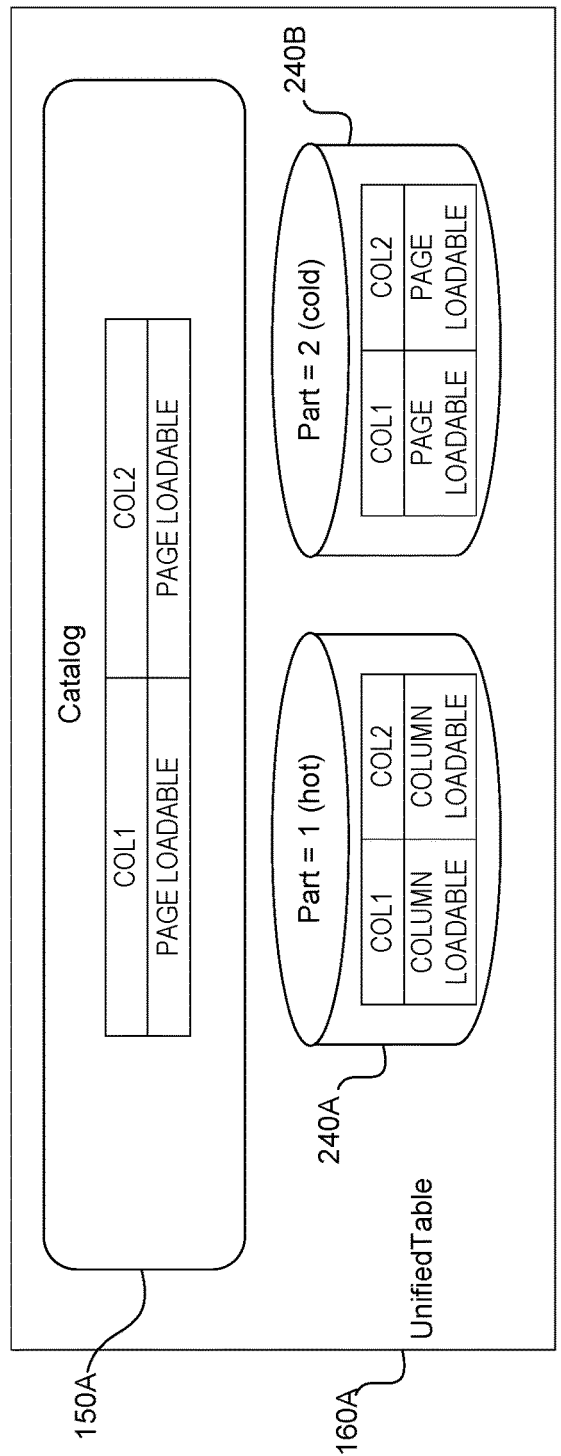
FIGS. 2A and 2B are block diagrams illustrating a metadata arrangement related to the operations of a metadata converter and memory management system (MCS), according to some embodiments.
Figure 2B:
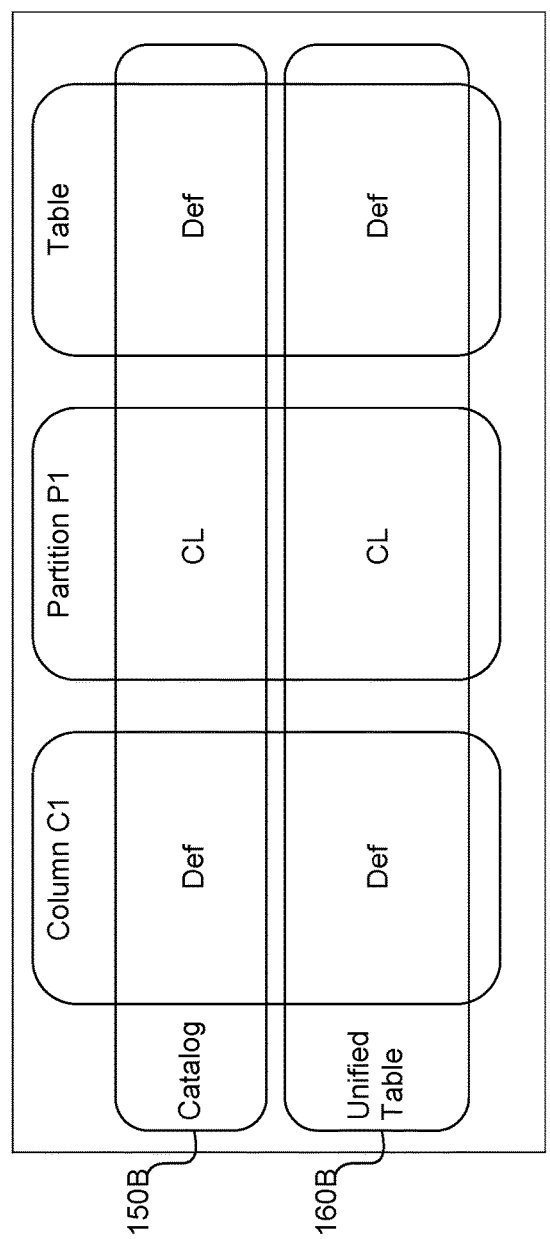

FIGS. 2A and 2B are block diagrams illustrating a metadata arrangement related to the operations of a metadata converter and memory management system (MCS), according to some embodiments.

FIG. 2A illustrates a block diagram 210 of an example of arrangement of catalog metadata 150A and UnifiedTable metadata 160A in accordance with the column metadata 114 configuration. The indication of "Page Loadable" may correspond to a set flag 115 value "1" and the indication of "Column Loadable" may correspond to an unset flag 115 value of "0". In catalog 150, both columns of a particular table may be indicated as page loadable. These catalog metadata 150A settings may be persisted to disk 106, and accessible from memory 104 during query processing.

In the UnifiedTable metadata 160A, settings may be divided into two separate containers 240A, 240B. The containers 240A, B may each correspond to the partitions 112A, 112B of the table 110. In other embodiments, if a table is divided into more partitions 112A, B, then UnifiedTable table 160A may include more corresponding containers 240A, 240B. In another embodiment, if a table does not have any partitions, then all of the UnifiedTable metadata 160A may be stored in a single container.

Data aging is another way to reduce memory pressure, and reducing the amount of data that is stored or maintained in memory 104, is by distinguishing hot data (e.g., frequently or recently used data) from cold data (e.g., rarely accessed or historical records). In many applications the bulk of the data may be cold and therefore may be maintained in disk storage 106, without taking up valuable storage in memory 104 until needed. MCS 102 may assign hot data as being column loadable ("CL") and cold data as being page loadable ("PL").

In an embodiment, the division of metadata into separate containers 240A and 240B may enable data aging using the column metadata 114 format. For example, database 113 may compare and combine the values from UnifiedTable table 160A and catalog 150A to determine how and/or which data to load into memory 104.

In an embodiment, in containers 240A, 204B, hot data may be marked as column loadable, while cold data is marked as page loadable. As such, the values in the partitions 240A, 240B of UnifiedTable table 160A may take priority over the values in catalog 150A. For example, Col. 1 is marked as page loadable in catalog 150A, but Col. 1 is also marked as column loadable in partition 240A. As such, if the data to be loaded is part of partition 1 in col 1, it is column loadable, otherwise if it is part of partition 2, Col. 1 it is page loadable.

FIG. 2B illustrates a block diagram 220 of how object metadata 118 may be stored across memory 104 and disk 106. The catalog 150B may correspond to metadata generally accessible from memory 104, and UnifiedTable 160B may be generally accessible from disk 106. In an embodiment, both catalog metadata 150B and UnifiedTable metadata 160B may each be separately persisted on disk 106, and may be loaded into memory 104 at different times. The values under each level setting (for column, partition, and table) may correspond to the hint 119.

In an embodiment, even though there may not have been explicitly defined values for partition in column metadata 114, MCS 102 may need read both UnifiedTable 160A and catalog 150A to determine what the partition level settings were for the data of table 110 from column metadata 114 (from FIG. 2A). As such, in FIG. 2B, both the column-level and table-level settings may set to default, which may be unchangeable, for a table 110 that is being loaded with data aged partitions, e.g., hot data and cold data.

As illustrated, the values of partition P1 may both be set to CL. This may further make updating partition-level settings faster and simpler for a user who wants to age the data of P1 from hot to cold. Further, database 113 may simply refer to the partition-level settings to determine how to load data of any of the columns in a data aged table that is divided into partitions.

Further, aging data (by a user) may be done directly by changing the hint 119 value for a particular partition within object metadata 118 (e.g., by using an ALTER TABLE command identifying the table, partition, and new value). However, as noted above, not all tables 110 may be or may be able to be time selected or data aged, the example of FIG. 2B may be for a time selection table (that enables data aging on a partition-by-partition basis).

Returning to FIG. 1, in an embodiment, object metadata 118 which may include table-level, partition-level, and column-level settings may be evaluated based on a hierarchy 116. Hierarchy 116 may indicate a priority order in which to read and/or prioritize the values of a particular table 110, particularly in case of data conflicts. For example, if a table is set to page loadable, and a column of the table is set to column-loadable, when data of the column is loaded into memory 104, database 113 and/or MCS 102 may need to determine whether to load the data of the column using page load or column load.

The example hierarchy 116 prioritizes column settings over partition settings, and partition settings over table settings. So, for example, if object metadata 118 includes a set value for a particular column, then there is no need to evaluate the partition or table level values, the column-level setting will be the way to load data.

However, if the column-level setting is set to default, then the partition-level settings are evaluated. Whatever value is set at partition-level is then executed for data load, if however partition-level is default, then table level is evaluated. If table level is set to default, then a system default load which may be either page or column load may be used. In other embodiments, other priority or weighing of the varying level values may be used in a hierarchy 116 to resolve conflicts to determine which loading technique to use to load particular data into memory 104.

There are various different scenarios when the migration from column metadata 114 to object metadata 18 may be performed by MCS 102. For example, database 113 (or an application requesting data or queries 108 from database 113) may have been operating on an old software version that used column metadata 114. However, in a new software version that has been installed, the new database software may now be using object metadata 118 (with additional level or granularity selections for data loading).

As such, all the data from the tables 110 of database 113 may need to migrated from the more restricted column-only level load preferences to a more expansive set of multi-level load preferences (i.e., table, partition, and column level). MCS 102 may perform or manage the conversion from column metadata 114 to object metadata 118 while maintaining as load preferences previously set in column metadata 114.

In another embodiment, database 113 may be operating with many or the majority of tables already being configured with the object metadata 118. However, database 113 may import or recover table 110 which may have only been configured with column metadata 114 indicating only column-level preferences across UnifiedTable metadata 160 and catalog metadata 150. MCS 102 may then be used to convert the column metadata 114 of table 110 to align with the object metadata 118 used by the majority or rest of the tables of database 113.

In a recovery migration, database 113 may have previously been operable using only column metadata 114 for its tables, and may have later migrated to using the object metadata 118 format. However, the old data (e.g., from when the database 113 was only operable with column metadata) may need to be recovered and loaded from the previous column metadata 114 operational period into the more expansive metadata arrangement of database 113. As such, the metadata from the old data may need to be migrated as part of the recovery process, as described herein.

In an embodiment, prior to performing a data migration on a data recovery operation, MCS 102 may perform a check to determine whether the table 110 to be recovered has been configured with the column metadata 114 or the object metadata 118 (and thus no migration would be necessary). In an embodiment, MCS 102 may determine this based on a table version. For example, each table 110 may be marked with a particular software or update version, and versions prior to a particular number or of a particular format may be designated as using column metadata 114, while versions of a newer number or updated version may be designated as already using object metadata 118.

When data is imported into database 113, MCS 102 must ensure that the imported column metadata 114 (corresponding to the imported data) is arranged in the object metadata 118 format. In an embodiment, a user could have updated column metadata 114, and set or change load preferences, using DDL (data definition language) commands such as CREATE TABLE or ALTER TABLE. Some tables 110 maybe in column metadata 114 and some may be in object metadata 118. In an import operation, the DDL commands (e.g., CREATE TABLE and ALTER TABLE) may be retrieved from a log and executed to recreate the catalog metadata 150A.

In an embodiment of data import, the column metadata information 114 may be received in an XML (extensible markup language) file, or another structured file format. MCS 102 may then scan the XML file for any hint 119 information and attribute that to the corresponding tables 110, and update object metadata 118 for those tables correspondingly. For any tables for which hints 119 do not exist in XML file, those the column metadata 114 is migrated as described herein.

As described above, the metadata of database 113 may be stored in both catalog metadata 150 format and UnifiedTable metadata 160 format. MCS 102 may perform a catalog migration of catalog metadata 150 from catalog 150A (as illustrated in FIG. 2A) to catalog 150B (as illustrated in FIG. 2B). For example, on a restart or boot up of database 113 (e.g., one or more devices across which database 113 may be operating) MCS 102 may perform the catalog migration. During the catalog migration, MCS 102 may initialize the hint 119 for the column, partition, and table levels as described below.

For non-time selection tables, if flag 115 for the column-level is marked as page loadable, then hint 119 is initialized or marked as page loadable. If flag 115 for the column-level is marked as column loadable, then hint 119 is marked as default loadable. In an embodiment, the table-level and partition-level hints 119 may both be marked as default, and the flag 115 for all the columns may be reset to 0.

In an embodiment, the flag 115 (of column metadata 114) may be persisted in object metadata 118, and reset to all 0s after the migration to object metadata 118 has completed. In another embodiment, flag 115 may be removed or not be part of the new object metadata 118.

For time selection tables, the column-level hints 119 may be set to default for all of the columns. For hot data, the partition level hints 119 are set to column loadable, and for cold partitions the hints 119 may be set to page loadable (if the table 110 is available to be paged).

In an embodiment, certain tables of database 113 may not be page loadable (e.g., may only be column loadable—which may be the database 113 default load), in which case, all of the preferences of the partitions of those tables are set to column loadable. Nonetheless, for time selection tables, the column-level and table-level settings may be set to default and be unalterable for time selection tables that rely on partitions for distinguishing between hot/cold data. The flag 115 for all of the columns may then be reset to 0.

In addition to performing catalog migration (of catalog metadata 150), MCS 102 may also perform a UnifiedTable metadata 160 migration. During the catalog migration (which may occur on system boot), the hint 119 for the catalog metadata 150 may have been initialized across the column, partition, and table levels. However, the hint 119 has not been yet initialized in the UnifiedTable metadata 160 portion of the object metadata 118.

In an embodiment, because UnifiedTable metadata 160 may include container information, and may be a more resource-intensive process to load and update relative to catalog metadata 150, MCS 102 may wait until a particular table 110 is loaded or requested before updating or migrating the UnifiedTable metadata 160—this may avoid long or resource intensive boot ups. In an embodiment, the table load may also be prompted by a query 108 request, or a DDL or DML command.

For non-time selection tables, if a flag 115 was set for a column as page loadable, then the column-level hint 119 is set as page loadable, otherwise the column-level hints 119 may be set to default loadable. The partition and table level hints 119 may be set to default loadable, and then the flag 115 for the columns may be reset to 0.

For time selection tables, the column-level hint 119 may be initialized or set to be default loadable for all of the columns, and the table-level hint 119 may be set to default as well. MCS 102 may set hot partitions to CL or column-loadable, and all other (or cold) partitions to page loadable (if available). If the table however is not page loadable, then, all the partitions of the table may be set to column loadable (e.g., regardless of whether the data is hot or cold). The flag 115 may then reset to 0 for all the columns in column metadata 114 (if persisted).

Figure 3:
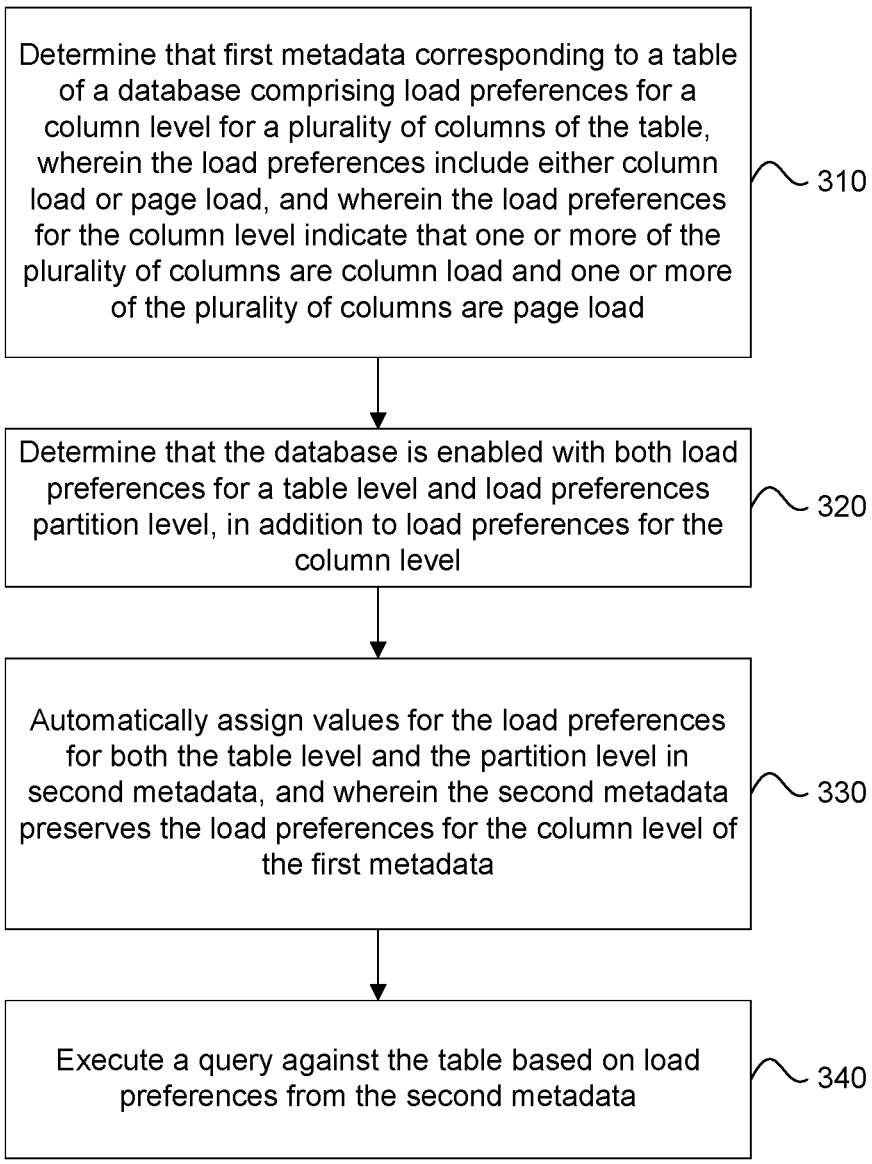
FIG. 3 is a flowchart illustrating example operations for providing a metadata converter and memory management system, according to some embodiments.

FIG. 3 is a flowchart 300 illustrating example operations for providing a metadata converter and memory management system, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1.

In 310, it is determined that first metadata corresponds to a table of a database comprising load preferences for a column level for a plurality of columns of the table, wherein the load preferences include either column load or page load, and wherein the load preferences for the column level indicate that one or more of the plurality of columns are column load and one or more of the plurality of columns are page load. For example, table 110 may include settings of column metadata 114, including load preferences for the columns (C1-C3), indicating whether to column load or page load (if available), the columns of table 110.

In 320, it is determined that the database is enabled with both load preferences for a table level and load preferences partition level, in addition to load preferences for the column level. For example, MCS 102 may determine that database 113 is operable with or needs to be configured to be operable with object metadata 118, which includes table-level, partition-level, and column-level load preferences indicated as "Def", "PL" and "CL".

In 330, values for the load preferences for both the table level and the partition level in second metadata are automatically assigned, wherein the second metadata preserves the load preferences for the column level of the first metadata. For example, MCS 102 may preserver the load preferences for C1 and C3 as "PL" in object metadata 118, preserver C2 as "CL", and set table and partition load preferences to "def." As described above, in an embodiment, the column-level preferences from column metadata 114 may be preserved at the partition level in object metadata 118 for time selection tables.

In an embodiment, original hot and cold data designations may be determined from a combination of column metadata 114 when comparing UnifiedTable metadata 160 with catalog metadata 150, as described with regards to FIG. 2A. This comparative analysis may enable MCS 102 to set some partition-level designations for time selection tables in which data is being aged on a partition-level basis.

In 340, a query is executed against the table based on load preferences from the second metadata. For example, MCS 102 or database 113 may receive query 108 and execute the query 108 against the data of table 110 that has been loaded into memory 104 in accordance with the updated object metadata 118. In an embodiment, a user may use DDL or DML commands to create new tables or alter the existing values of object metadata 118, which may be then implemented and used to execute future queries 108.

Figure 4:
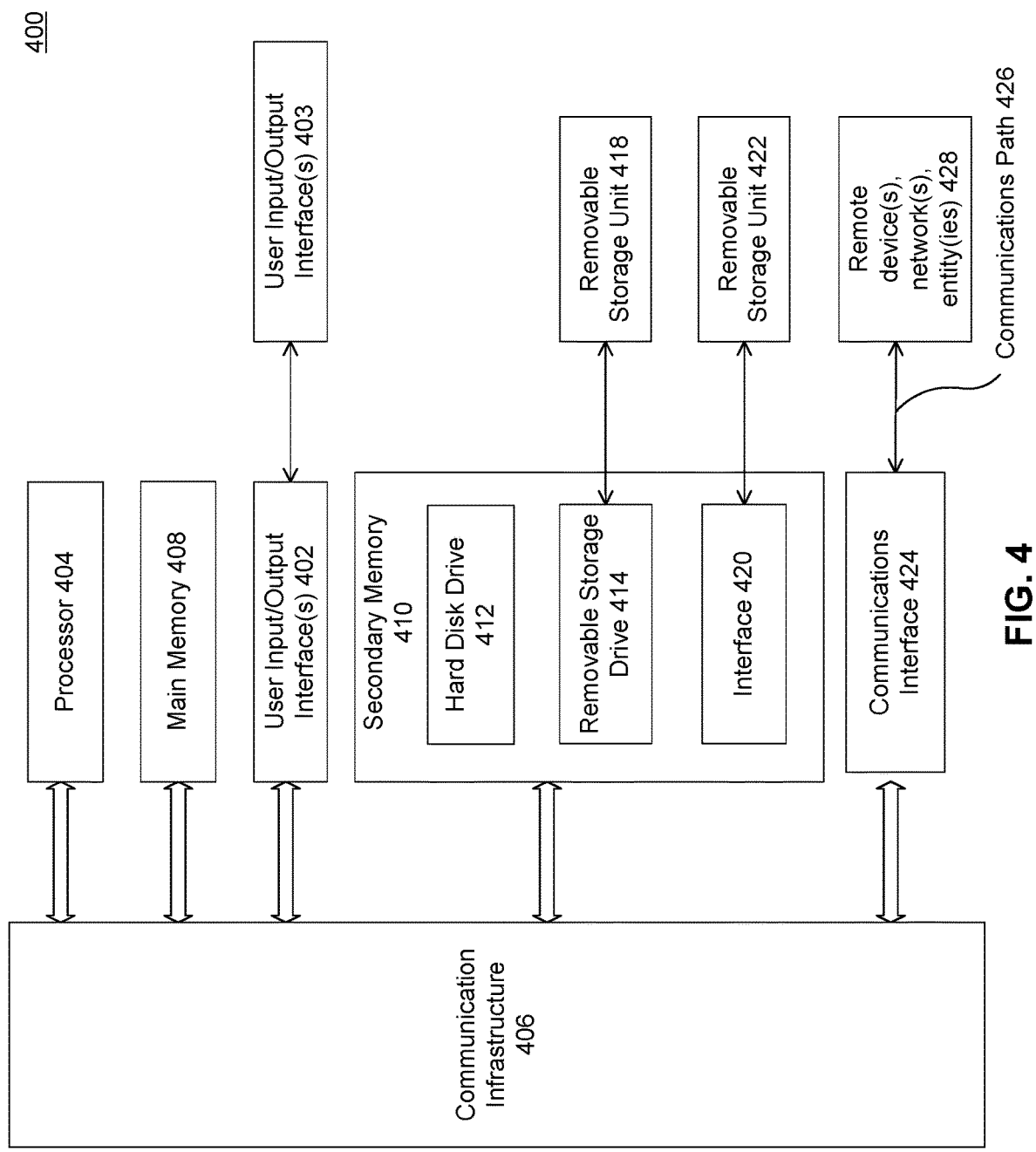
FIG. 4 is example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for managing memory used to process queries to a database, comprising:
   determining that a query to be executed against a table of the database has been received;
   determining that first metadata of the table of the database comprises load preferences for each of a plurality of columns of the table, wherein the load preferences include either column load or page load, and wherein the load preferences indicate that one or more of the plurality of columns are column load and one or more of the plurality of columns are page loadable;
   determining that the database is enabled with both load preferences at a table level and load preferences for a column level;
   automatically assigning values for the load preferences for the table level and in second metadata, and wherein the second metadata preserves the load preferences for the column level of the first metadata, wherein the first metadata comprises a flag that indicates which of the plurality of columns are page loadable, wherein the flag is set for a first column of the plurality of columns as page loadable, wherein page loadable indicates that a first memory page of a plurality of memory pages of the first column is loaded into memory responsive to a memory load command, and wherein column load indicates that all of the plurality of memory pages of the first column are loaded into memory responsive to the memory load command; and
   executing a query against the table based on load preferences from the second metadata, wherein data from the first memory page of the first column is loaded into memory responsive to a memory load command associated with executing the query.

2. The method of claim 1, wherein the second metadata includes a load hint that indicates whether a particular database object is column load, page load, or default load, wherein the load hint replaces the flag, and wherein the database object includes an indicator corresponding to one of the table, a partition within the table, or one of the plurality of columns of the table.

3. The method of claim 2, wherein the default load corresponds to the column load.

4. The method of claim 2, further comprising:
   setting the load hint for a first column of the table to page load if the flag is set, wherein the set flag corresponds to page load.

5. The method of claim 3, further comprising:
   setting the load preferences for the column level for each of the plurality of columns of the table to a default load in the second metadata;
   setting the load preferences for a partition level of a first partition to column load in the second metadata;
   setting the load preferences for the partition level of a second partition to page load in the second metadata; and
   setting the load preferences for the table level of the table to the default load in the second metadata.

6. The method of claim 1, wherein the table comprises a time selection table and wherein the first metadata indicates that a first partition is marked as hot data, and a second partition is marked as cold data, wherein the hot data is maintained in a memory, and wherein the cold data is maintained in disk storage.

7. A system for managing memory used to process queries to a database, comprising:
   a memory device; and
   at least one hardware processor coupled to the memory device and configured to perform operations comprising:
      determining that a query to be executed against a table of the database has been received;
      determining that first metadata of the table of the database comprises load preferences for each of a plurality of columns of the table, wherein the load preferences include either column load or page load, and wherein the load preferences indicate that one or more of the plurality of columns are column load and one or more of the plurality of columns are page loadable;
      determining that the database is enabled with both load preferences at a table level and load preferences for a column level;
      automatically assigning values for the load preferences for the table level and in second metadata, and wherein the second metadata preserves the load preferences for the column level of the first metadata, wherein the first metadata comprises a flag that indicates which of the plurality of columns are page loadable, wherein the flag is set for a first column of the plurality of columns as page loadable, wherein page loadable indicates that a first memory page of a plurality of memory pages of the first column is loaded into memory responsive to a memory load command, and wherein column load indicates that all of the plurality of memory pages of the first column are loaded into memory responsive to the memory load command; and
      executing a query against the table based on load preferences from the second metadata, wherein data from the first memory page of the first column is loaded into memory responsive to a memory load command associated with executing the query.

8. The system of claim 7, wherein the second metadata includes a load hint that indicates whether a particular database object is column load, page load, or default load, wherein the load hint replaces the flag, and wherein the database object includes an indicator corresponding to one of the table, a partition within the table, or one of the plurality of columns of the table.

9. The system of claim 7, wherein the default load corresponds to the column load.

10. The system of claim 7, the operations further comprising:
   setting the load hint for a first column of the table to page load if the flag is set, wherein the set flag corresponds to page load.

11. The system of claim 10, the operations further comprising:
   setting the load preferences for the column level for each of the plurality of columns of the table to a default load in the second metadata;
   setting the load preferences for a partition level of a first partition to column load in the second metadata;
   setting the load preferences for the partition level of a second partition to page load in the second metadata; and
   setting the load preferences for the table level of the table to the default load in the second metadata.

12. The system of claim 7, wherein the table comprises a time selection table and wherein the first metadata indicates that a first partition is marked as hot data, and a second partition is marked as cold data, wherein the hot data is maintained in a memory, and wherein the cold data is maintained in disk storage.

13. A non-transitory computer-readable device having instructions stored thereon that, when executed by at least one hardware computing device, cause the at least one hardware computing device to perform operations comprising:
   determining that a query to be executed against a table of the database has been received; determining that first metadata of the table of the database comprises load preferences for each of a plurality of columns of the table, wherein the load preferences include either column load or page load, and wherein the load preferences indicate that one or more of the plurality of columns are column load and one or more of the plurality of columns are page loadable;
   determining that the database is enabled with both load preferences at a table level and load preferences for a column level;
   automatically assigning values for the load preferences for the table level and in second metadata, and wherein the second metadata preserves the load preferences for the column level of the first metadata, wherein the first metadata comprises a flag that indicates which of the plurality of columns are page loadable, wherein the flag is set for a first column of the plurality of columns as page loadable, wherein page loadable indicates that a first memory page of a plurality of memory pages of the first column is loaded into memory responsive to a memory load command, and wherein column load indicates that all of the plurality of memory pages of the first column are loaded into memory responsive to the memory load command; and
   executing a query against the table based on load preferences from the second metadata, wherein data from the first memory page of the first column is loaded into memory responsive to a memory load command associated with executing the query.

14. The device of claim 13, wherein the second metadata includes a load hint that indicates whether a particular database object is column load, page load, or default load, wherein the load hint replaces the flag, and wherein the database object includes an indicator corresponding to one of the table, a partition within the table, or one of the plurality of columns of the table.

15. The device of claim 14, wherein the default load corresponds to the column load.

16. The device of claim 14, the operations further comprising:
   setting the load hint for a first column of the table to page load if the flag is set, wherein the set flag corresponds to page load.

17. The device of claim 16, the operations further comprising:
   setting the load preferences for the column level for each of the plurality of columns of the table to a default load in the second metadata;
   setting the load preferences for a partition level of a first partition to column load in the second metadata;
   setting the load preferences for the partition level of a second partition to page load in the second metadata; and setting the load preferences for the table level of the table to the default load in the second metadata.

18. The method of claim 1, wherein an unflagged column indicates that the unflagged column is column load.

* * * * *